US012142845B2

(12) United States Patent
Wei et al.

(10) Patent No.: US 12,142,845 B2
(45) Date of Patent: Nov. 12, 2024

(54) ANTENNA RADIATORS FORMED BY COAXIAL CABLES

(71) Applicant: Hewlett-Packard Development Company, L.P., Spring, TX (US)

(72) Inventors: Yung-Chang Wei, Taipei (TW); Chin-Hung Ma, Taipei (TW); I-Chen Lin, Taipei (TW); Po Chao Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 156 days.

(21) Appl. No.: 18/171,262

(22) Filed: Feb. 17, 2023

(65) Prior Publication Data

US 2024/0283152 A1 Aug. 22, 2024

(51) Int. Cl.

*H01Q 5/307* (2015.01)
*H01Q 1/24* (2006.01)
*H01Q 1/42* (2006.01)
*H01Q 1/48* (2006.01)
*H01Q 9/04* (2006.01)

(52) U.S. Cl.

CPC ............... *H01Q 5/307* (2015.01); *H01Q 1/24* (2013.01); *H01Q 1/42* (2013.01); *H01Q 1/48* (2013.01); *H01Q 9/0421* (2013.01); *H01Q 9/045* (2013.01)

(58) Field of Classification Search

CPC ............ H01Q 5/307; H01Q 1/24; H01Q 1/42; H01Q 1/48; H01Q 9/0421; H01Q 9/045; H01Q 1/243

See application file for complete search history.

(56) References Cited

U.S. PATENT DOCUMENTS

| | | | | |
|---|---|---|---|---|
| 8,754,820 B2 * | 6/2014 | Iwai | H01Q 1/243 | 343/702 |
| 9,780,444 B2 | 10/2017 | Huang et al. | | |
| 11,569,571 B2 * | 1/2023 | Chang | H01Q 5/35 | |
| 2008/0068282 A1 | 3/2008 | Iizuka | | |
| 2013/0335292 A1 * | 12/2013 | Hung | H01Q 9/42 | 343/866 |
| 2014/0022141 A1 | 1/2014 | Tsao | | |
| 2015/0236407 A1 | 8/2015 | Hwang et al. | | |
| 2018/0241120 A1 * | 8/2018 | Li | H01Q 1/243 | |

FOREIGN PATENT DOCUMENTS

EP 2624363 A1 * 8/2013 ............. H01Q 1/243

* cited by examiner

*Primary Examiner* — Seung H Lee
(74) *Attorney, Agent, or Firm* — Knobbe, Martens, Olson & Bear, LLP

(57) ABSTRACT

The present disclosure relates to a compact antenna system within a dielectric housing of an electronic device, capable of achieving improved reflection performance. The antenna system includes a ground plane and an antenna PCB. An antenna microstrip feed on a side of the antenna PCB comprises a first part of a radiating antenna element. The antenna PCB is connected to the ground plane by a central conductor of a coaxial cable which forms a ground path. An outer conductor of the coaxial cable carries RF signals to the antenna PCB, allowing the RF signals to freely radiate along a length of the coaxial cable and acting as a second part of the radiating antenna element. The coaxial cable does not interfere with, and can even enhance a radiation pattern of the antenna microstrip feed.

20 Claims, 5 Drawing Sheets

ANTENNA RADIATORS FORMED BY COAXIAL CABLES

BACKGROUND

An antenna system of an electronic device can include a plurality of antenna types for wireless connectivity. Examples of electronic devices include, but are not limited to, mobile phones, tablets, base stations, network access points, customer-premises equipment (CPE), laptops, and wearable electronics.

DETAILED DESCRIPTION

Figure 1:
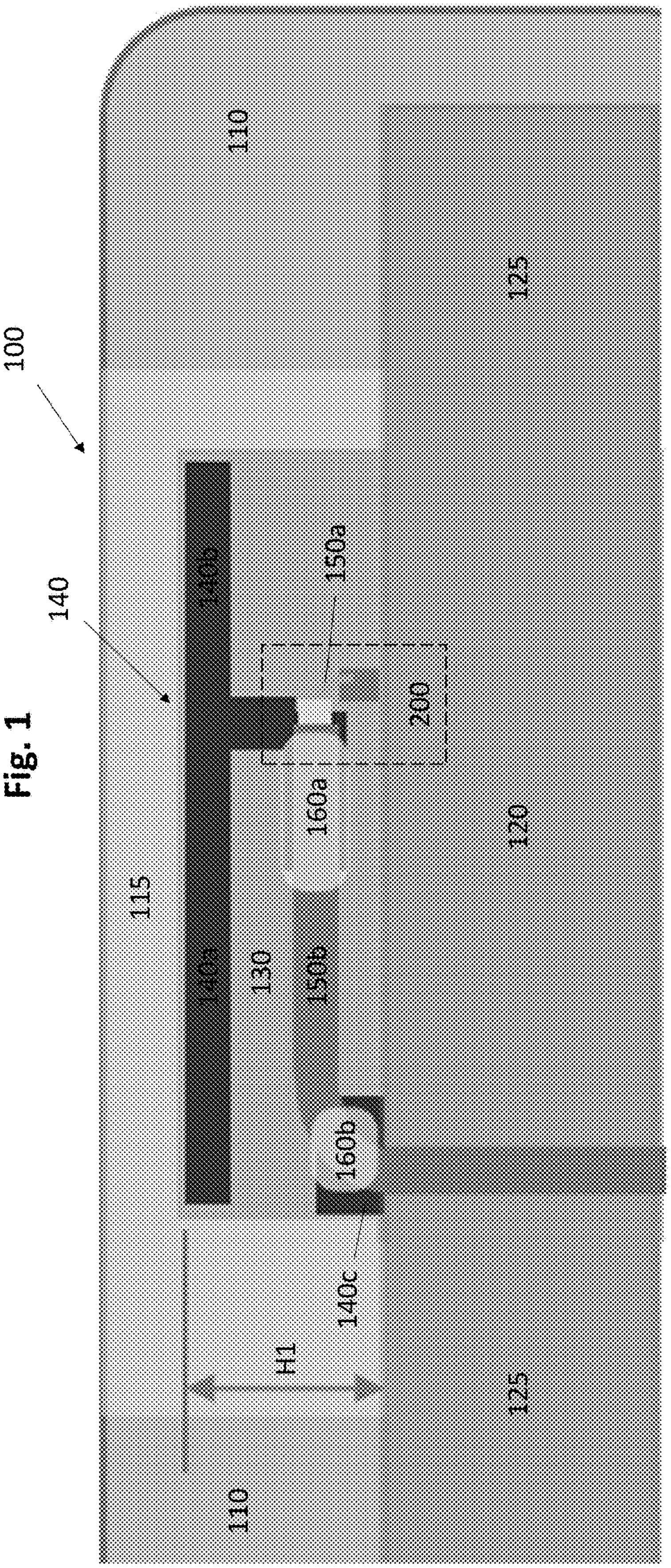
FIG. 1 is an example schematic representation of an antenna system of an electronic device including a grounded central conductor of a coaxial cable as described herein.

Modern electronic devices such as notebook computers can suffer from compromised antenna performance due to space constraints in a smaller and thinner display housing. This poor antenna performance leads to more reflected radio frequency (RF) power, poor wireless connectivity, and a frustrating user experience.

The aforementioned challenges, among others, are addressed in some examples by the disclosed techniques for improving reflection performance and radiation pattern of a compact antenna system. For example, by using a central conductor of a coaxial cable as a ground path, an antenna height of the antenna system is effectively increased, and antenna performance can be maintained despite the space constraints. An outer conductor of the coaxial cable carrying RF signals can also radiate to free space, improving connectivity of the electronic device, and user experience can be enhanced.

Examples described herein provide an antenna system suitable for compact devices with good dual-band performance. For example, an electronic device can include a dielectric housing; a ground plane; a coaxial cable including a central conductor and an outer conductor; and an antenna printed circuit board (PCB) communicatively connected to the outer conductor of the coaxial cable and located within the dielectric housing, the antenna PCB including: an antenna microstrip feed located on the antenna PCB, a portion of the antenna microstrip feed forming a first part of a radiating antenna element; and an antenna feed point located on the antenna microstrip feed, wherein the outer conductor of the coaxial cable is communicatively connected to the antenna microstrip feed at the antenna feed point, wherein the central conductor is a ground path from the antenna PCB to the ground plane, and wherein the outer conductor is a second part of the radiating antenna element.

In another example, an electronic device can include a display panel; a RF transparent housing; an RF module; and an antenna system communicatively connected to the RF module, the antenna system including: a ground plane; and a coaxial cable including a central conductor and an outer conductor; and an antenna printed circuit board (PCB) communicatively connected to the outer conductor of the coaxial cable and located within a region of the RF transparent housing adjacent to an edge of the display panel, the antenna PCB including a planar antenna patch, wherein a portion of the antenna patch forms a first part of a radiating antenna element, wherein the central conductor forms a ground path from the antenna PCB to the ground plane, and wherein the outer conductor is a second part of the radiating antenna element.

In an additional example, an electronic device can include a dielectric housing; a ground plane; a coaxial cable including a central conductor and an outer conductor; and an antenna printed circuit board (PCB) communicatively connected to the outer conductor of the coaxial cable and located within the dielectric housing, the antenna PCB including: an antenna microstrip feed located on the antenna PCB; and an antenna feed point located in a central region of the antenna microstrip feed such that the antenna feed point separates the antenna microstrip feed into a first part of a radiating antenna element and a second part of the radiating antenna element, wherein the outer conductor of the coaxial cable is communicatively connected to the antenna microstrip feed at the antenna feed point, wherein the central conductor is a ground path from the antenna PCB to the ground plane, wherein the outer conductor is a third part of the radiating antenna element, and wherein the first part of the radiating antenna element has a first length and the second part of the radiating antenna element has a second length corresponding to two different wavelengths of RF signals.

Referring initially to FIG. 1, an antenna system 100 of an electronic device is shown. The electronic device can be a computing device, mobile device, or any other type of electronic device known in the art. In one example, the electronic device is a notebook computer having a first housing and a second housing rotatably connected by a hinge. The first housing can be, for example, a display housing, and the second housing can be, for example, a keyboard housing or another display housing.

The antenna system 100 is located within a housing 110, such as the first housing. The housing 110 can include a RF-transparent portion 115 located along a perimeter edge (hereafter referred to as the RF window 115), allowing the antenna system to transmit and receive RF signals even if the housing 110 is a metal housing. In other cases, the housing 110 can be a dielectric housing which is at least partially RF-transparent. The dielectric housing 110 and/or RF window 115 can be polymer, glass, organic material (e.g., wood or bamboo), or other dielectric materials. The housing 110 further includes a display panel 125 of the electronic device, such as a Light Emitting Diode (LED) display panel, Liquid Crystal Display (LCD) panel, micro LED panel, or any other flat panel display technology.

An RF shield covers a back side of the display panel 125, forming a ground plane 120. The ground plane 120 can be a foil layer (e.g., copper foil) located behind the display panel 125, or the display panel can include a metal back plate.

An antenna printed circuit board (PCB) 130 is located adjacent to the display panel 125 within the perimeter edge of the housing 110. The antenna PCB 130 comprises an antenna microstrip feed 140 located on a first side of the PCB. The antenna PCB 130 can be a single or double-sided PCB, and in some cases includes an antenna microstrip feed 140 on either side. The antenna PCB 130 can also be a flexible ("flex") PCB for more versatility, and to better fit inside a narrow space provided within the housing 110. In some cases, the antenna microstrip feed 140 can include a stripline feed, antenna stub, or another part of an antenna system implemented on the antenna PCB 130.

In certain implementations, the antenna PCB 130 can be omitted in favor of a different technology. For example, laser direct structuring (LDS) can be used to form the antenna microstrip feed 140 within a three-dimensional dielectric portion. Injection molding or other molding techniques can also be used to mold a dielectric layer around the antenna microstrip feed 140 without adversely affecting a radiation pattern of the antenna system 100. Resin, polymer, or other malleable dielectrics can be used to create a protective layer around the antenna microstrip feed 140 even when very little space is available inside the housing 110. It will be appreciated by those skilled in the art that molding can be performed as a final step of assembling the antenna system 100, contouring the dielectric to fill cavities in the housing 110 and sealing the various components in place.

The antenna microstrip feed 140 includes a first branch **140*a* and a second branch 140*b* which are separated by an antenna feed point 160*a* proximal to the center of the antenna PCB 130. The first branch 140*a* and the second branch 140*b* of the antenna microstrip feed 140 form a first part and a second part of a radiating antenna element of the antenna system 100. As is discussed herein, the first part and the second part of the radiating antenna element can correspond to different operating bands of a dual-band antenna system 100. In certain implementations, the antenna microstrip feed 140 can have only a first branch 140*a* forming a first part of a radiating antenna element for a single-band antenna system 100. The antenna microstrip feed 140 can further include one or more microstrip segments 140*c* on the antenna PCB 130. The first branch 140*a*, second branch 140*b*, and microstrip segments 140*c* of the antenna microstrip feed 140 are connected together by a coaxial cable 150**.

The coaxial cable 150 comprises a central (inner) conductor **150*a* and an outer conductor 150*b*. The central conductor 150*a* and the outer conductor 150*b* are a pair of concentric cylindrical conductors separated by a dielectric medium. Portions of the coaxial cable 150 can be insulated by a rubber, vinyl, or other type of insulating jacket. The central conductor 150*a* is a solid conductor of a conductive material (e.g., copper or aluminum) and the outer conductor 150*b* can be a stranded conductor of the same conductive material which encircles the central conductor 150*a*. In some cases, each conductor 150*a* and 150*b* can be of a different conductive material. The central conductor 150*a* can also be a stranded conductor for greater flexibility of the coaxial cable 150. The dielectric medium can be one or more layers of polytetrafluoroethylene (PTFE), polyethylene foam, solid polyethylene, or another polymer known to one skilled in the art. In some cases, a cavity may exist between the central conductor 150*a* and the outer conductor 150*b* such that the conductors are separated by an air gap. Additional layers, such as an RF shielding layer, can be provided between the central conductor 150*a* and the outer conductor 150*b*. The coaxial cable 150 can be modified, such as by removing portions of the insulating jacket, outer conductor 150*b*, and/or dielectric, to connect the central conductor 150*a* and outer conductor 150*b* to the antenna microstrip feed 140**.

The central conductor **150*a* of the coaxial cable forms a ground path from the antenna PCB 130 to the ground plane 120 to ground the antenna system 100. The outer conductor 150*b* of the coaxial cable is communicatively connected to the antenna microstrip feed 140 at the antenna feed point 160*a*. The outer conductor 150*b* is configured to carry RF signals between an RF module (e.g., an RF transceiver and/or front-end module) and the antenna PCB 130. Depending on whether the antenna system 100 is a single-band or dual-band system, the outer conductor 150*b* of the coaxial cable can form a second part or a third part of the radiating antenna element, allowing the RF signal to radiate to free space as it is transmitted between the RF module and the antenna feed point 160*a***.

The coaxial cable 150 is electrically connected to the antenna PCB 130 at least at the antenna feed point **160*a*, such as by soldering. The outer conductor 150*b* of the coaxial cable 150 can also be connected to the microstrip segments 140*c* of the antenna microstrip feed 140 by soldering. In addition to electrically connecting the branches 140*a-b* and segments 140*c* of the antenna microstrip feed 140, the coaxial cable 150 is mechanically mounted to the antenna PCB 130 by the outer conductor 150*b*. The coaxial cable 150 can be mounted to the antenna PCB 130 at the antenna feed point 160*a* and additional mounting points 160*b* corresponding to each of the one or more microstrip segments 140*c*. The antenna feed point 160*a* and additional mounting point(s) 160*b* can be two or more solder points used to electrically and mechanically connect the outer conductor 150*b* across the antenna PCB 130. In addition to soldering, an adhesive or a molded dielectric as discussed herein can be used to mount the coaxial cable 150 at the antenna feed point 160*a* and additional mounting point(s) 160*b* on the antenna microstrip feed 140**.

Those skilled in the art will appreciate that the outer conductor **150*b*, representing a second part or a third part of the radiating antenna element, can effectively replace a portion of the antenna microstrip feed 140 (i.e., a "leg" of the antenna system 100) on the antenna PCB 130. Therefore, it is not necessary for the antenna microstrip feed 140 to be a single contiguous piece. The microstrip segments 140*c* provide a mounting point for the coaxial cable 150 and can be electrically connected by soldering to the outer conductor 150*b*, forming the second or third part of the radiating antenna element of the antenna system 100**.

One advantage of the antenna system 100 of FIG. 1 is that the layout of the antenna PCB 130 allows for an increased antenna height H1. The antenna height H1 is measured from a proximal edge of the ground plane 120 to the first branch **140*a* or the second branch 140*b* of the antenna microstrip feed 140. The edge of the ground plane 120 can be aligned with an edge of the display panel 125, although in some implementations, the ground plane 120 may extend beyond the footprint of the display panel 125** for improved RF shielding.

The first branch **140*a* and the second branch 140*b* of the radiating antenna element can be parallel to the edge of the ground plane 120 such that the antenna height H1 is constant throughout the antenna system. (i.e., a first antenna height $H1_1$ measured from a proximal end of the first part of the radiating antenna element and a second antenna height $H1_2$ measured from a distal end of the second part of the radiating antenna element are equidistant to the proximal edge of the ground plane 120**.) Because the coaxial cable 150 is routed along the antenna PCB 130 over the one or more microstrip segments 140c of the antenna microstrip feed 140, a space is provided on the antenna PCB 130 below the antenna microstrip feed 140 to maintain a RF line-of-sight corresponding to the antenna height H1. The coaxial cable 150 does not obstruct this RF line-of-sight between the antenna microstrip feed 140 and the ground plane 120.

In some cases, the first branch 140a and the second branch 140b of the radiating antenna element do not form a straight-line radiator, but can still be parallel to the edge of the ground plane 120. For example, the first branch 140a can have a first antenna height H1 and the second branch 140b can have a second antenna height H2. Alternatively, the radiating antenna element can have a curved portion along the antenna microstrip feed 140. The radiating antenna element can have a first height H1 at the proximal end of the first branch 140a and a second height H2 at the distal end of the second branch 140b, wherein antenna height is continuously varied between the two ends. The antenna height(s) and configuration of the antenna microstrip feed 140 can be adapted to allow the antenna PCB 130 to fit inside various types of housings 110.

The ground path of the central conductor 150a is shielded by the outer conductor 150b carrying RF signals, thereby preventing the ground path from inadvertently coupling RF emissions of the antenna system 100 to the ground plane 120. The coaxial cable 150 therefore does not interfere with or adversely affect a radiation pattern of the radiating antenna element. The coaxial cable 150 as described herein can improve performance of the antenna system 100 in scenarios where performance would otherwise be compromised by a grounded outer conductor coupling RF emissions, effectively reducing the antenna height H1. The coaxial cable 150 being grounded by the central conductor 150a can also allow the antenna PCB 130 to be made smaller without a corresponding reduction in antenna height and performance.

Figure 2:
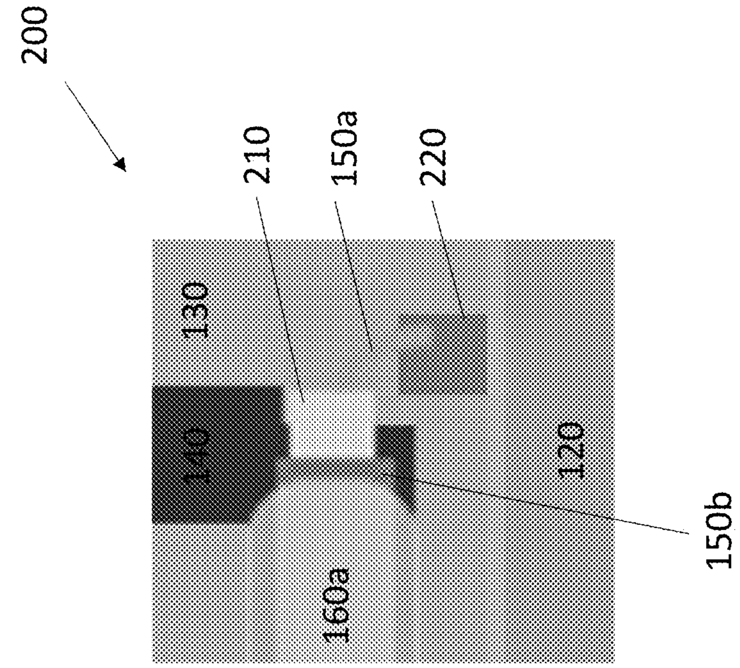
FIG. 2 is an enlarged view of a ground path of the antenna system of FIG. 1.

FIG. 2 illustrates a ground path 200 of the antenna system 100 adjacent to the antenna feed point 160a. The ground path comprises a central part of the antenna microstrip feed 140, the coaxial cable 150, and the ground plane 120. An end portion of the coaxial cable 150 can be soldered to the antenna feed point 160a and the additional mounting point 160b of FIG. 1. A tip of the end portion of the coaxial cable 150 extends beyond the antenna feed point 160a. The tip of the coaxial cable 150 does not include the outer conductor 150b, exposing a portion of the central conductor 150a and a layer of the dielectric medium 210 which insulates the central conductor 150a within the cable 150. The exposed, partially unshielded portion of the central conductor 150a provides a ground path from the antenna PCB 130 to a ground patch 220 adjacent to the ground plane 120. The ground patch 220 can be a copper tab which extends past the edge of the ground plane 120 to provide a solder point for the central conductor 150a. The ground patch 220 allows the antenna system 100 to be assembled more easily in a factory setting. In certain implementations, the exposed portion of the central conductor 150a can extend to a solder point directly on the ground plane 120. The central conductor 150a is narrow, and the exposed portion does not obstruct the RF line-of-sight from the antenna microstrip feed 140 to the ground plane 120, preserving the antenna height H1 and performance.

Figure 3:
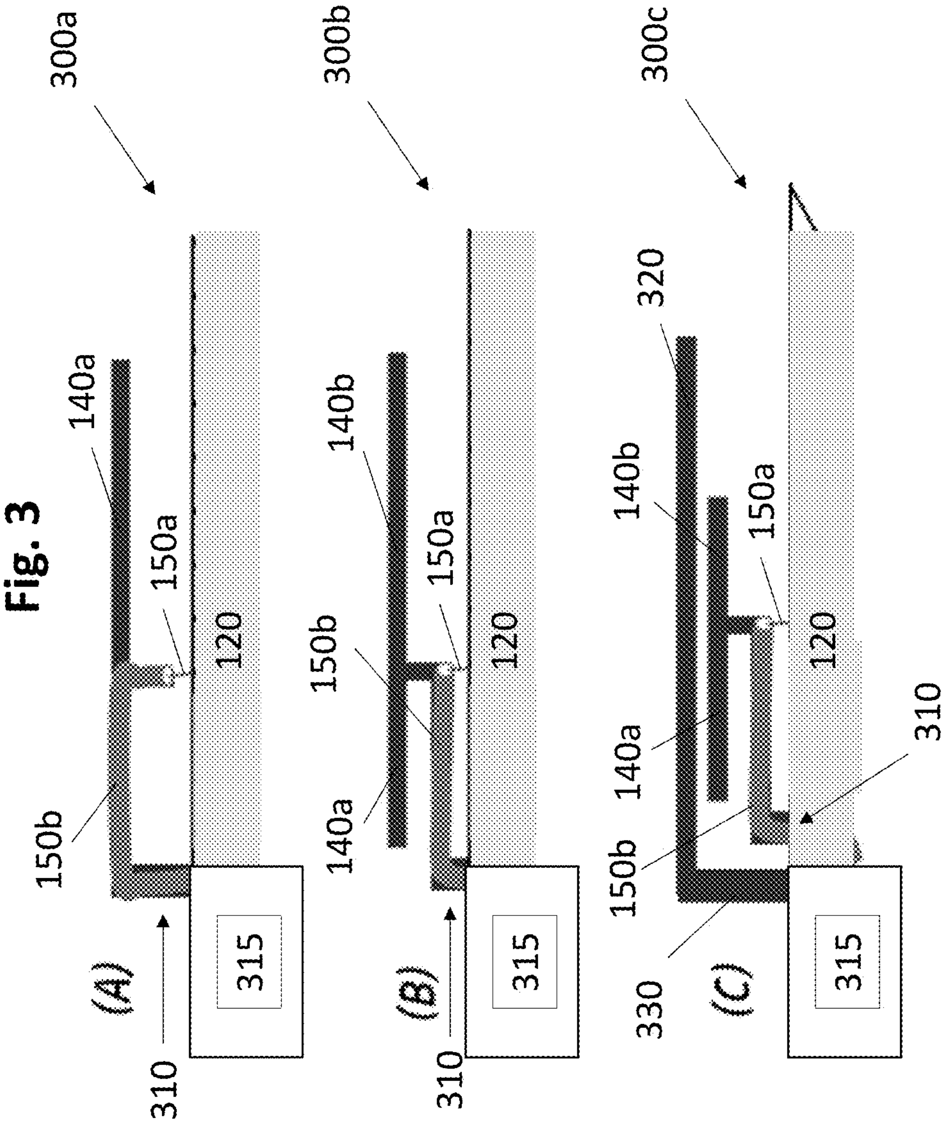
FIGS. 3A-3C are examples of an inverted-F antenna of an antenna system.

FIGS. 3A-3C are different examples of an inverted-F antenna of the antenna system 100. In FIG. 3A, a single-band inverted-F antenna 300a is formed by the antenna microstrip feed 140 and coaxial cable 150 above the ground plane 120. The coaxial cable 150 is routed along a first leg 310 of the single-band inverted-F antenna 300a to the antenna feed point 160a located roughly at the center of the antenna PCB 130. (Although the antenna microstrip feed 140 is illustrated as a contiguous microstrip feed in FIGS. 3A-3C, it will be understood by those skilled in the art that the microstrip feed 140 can comprise additional microstrip segments 140c connected by the outer conductor 150b of the coaxial cable 150) The central conductor 150a provides a ground path at the antenna feed point 160a from the end portion of the coaxial cable 150 directly to the ground plane 120. The radiating antenna element comprises a first branch 140a of the antenna microstrip feed 140 and the outer conductor 150b of the coaxial cable 150. The radiating antenna element is a straight-line radiator parallel to the proximal edge of ground plane 120.

The length of the radiating antenna element can correspond to an operating band of an RF module 315 of the antenna system 100. For example, the RF module 315 can support Wi-Fi communication such as 2.4 GHz band Wi-Fi and/or 5 GHz band Wi-Fi. The RF module 315 can support any type of WLAN or WWAN connectivity known to one skilled in the art, including Wi-Fi, Bluetooth, ultra-wideband (UWB), 4G LTE, 5G NR, geolocation standards, and the like. The single-band inverted-F antenna 300a can be a fractional wavelength antenna, such as ½ wavelength, ¼ wavelength, ⅛ wavelength, ⅝ wavelength, or similar. The inverted-F antennas of the antenna system 100 as described herein can be used to provide coverage across multiple frequency bands and/or communication standards.

FIG. 3B shows a dual-band configuration of an inverted-F antenna 300b formed again by the antenna microstrip feed 140 and coaxial cable 150 above the ground plane 120. The coaxial cable 150 is routed along a first leg 310 of the dual-band inverted-F antenna 300b to the antenna feed point 160a located roughly at the center of the antenna PCB 130. The central conductor 150a provides a ground path at the antenna feed point 160a from the end portion of the coaxial cable 150 directly to the ground plane 120. Unlike the single-band example of FIG. 3A, the antenna microstrip feed 140 forms a "T" shape with the first branch 140a and the second branch 140b diverging above the antenna feed point 160a. A length of the first branch 140a and the second branch 140b can each correspond to a different operating band of the RF module 315 of the antenna system 100.

For example, the first branch 140a of the antenna microstrip feed 140 can have a length which is a multiple of 12.5 centimeters, forming a first part of the radiating antenna element configured for TX/RX operation in the 2.4-2.5 GHz Wi-Fi band. The second branch 140b of the antenna microstrip feed 140 can have a length which is a multiple of 5 centimeters, forming a second part of the radiating antenna element configured for TX/RX operation in the 5-7 GHz Wi-Fi band. For space savings within the housing 110, each branch of the antenna microstrip feed 140 can be a ¼ wavelength antenna or smaller. For example, the length of the first branch 140a can be less than about 3.12 centimeters and the length of the second branch 140b can be less than about 1.25 centimeters. These dimensions of the antenna microstrip feed 140 can be adjusted depending on the application of the antenna system 100 and the electronic device, providing coverage of relevant frequency bands and complementing any other antenna microstrip feeds 140 of the antenna system.

The outer conductor 150b can form a third part of the radiating antenna element at an end portion of the coaxial cable 150 between the antenna feed point 160a and the first leg 310. The length of the coaxial cable 150 can be selected for impedance matching with the first and second parts of the radiating antenna element. For example, the outer conductor 150*b* of the coaxial cable 150 can have a characteristic impedance of 50 ohms, 75 ohms, 300 ohms, or another impedance matched to the dual-band inverted-F antenna 300*b*. The RF module 315 is communicatively coupled to the outer conductor 150*b* of the coaxial cable 150 to transmit or receive RF signals by the dual-band inverted-F antenna 300*b*.

FIG. 3C illustrates a modified dual-band inverted-F antenna 300*c* including a parasitic element 320. The dual-band inverted-F antenna 300*c* is formed by the antenna microstrip feed 140 and coaxial cable 150 above the ground plane 120. The coaxial cable 150 is routed along a first leg 310 of the inverted-F antenna 300*c* to the antenna feed point 160*a* located roughly at the center of the antenna PCB 130. The central conductor 150*a* provides a ground path at the antenna feed point 160*a* from the end portion of the coaxial cable 150 directly to the ground plane 120. The first branch 140*a* and second branch 140*b* of the antenna microstrip feed 140 collectively form a straight-line portion of the radiating antenna element. The outer conductor 150*b* of the coaxial cable 150 can form an additional third part of the radiating antenna element as discussed herein.

A parasitic element 320 is adjacent to and parallel with the straight-line portion of the radiating antenna element. The parasitic element 320 includes a second leg 330 to connect the parasitic element directly to the ground plane 120 at the edge of the antenna PCB 130. The parasitic element 320 can contribute to resonance effects of the dual-band inverted-F antenna 300*c*, and allows the antenna system 100 to achieve equivalent performance in a smaller footprint compared to the dual-band inverted-F antenna 300*b* of FIG. 3B. The parasitic element has a length greater than the sum of the lengths of the first branch 140*a* and the second branch 140*b* of the antenna microstrip feed 140. The parasitic element 320 can be used with the single-band inverted-F antenna 300*a* of FIG. 3A. The parasitic element 320 can have a resonant frequency corresponding to a frequency band operable by the RF module 315.

Figure 4B:
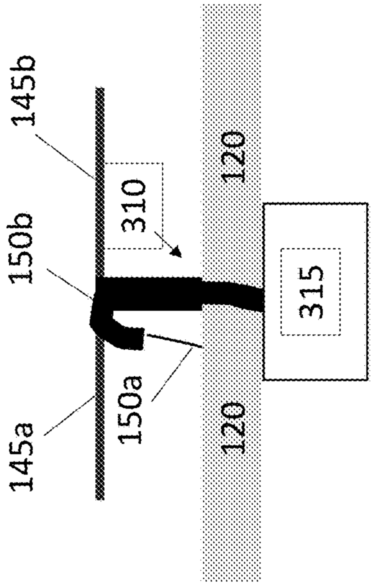
FIG. 4B is an elevational view of the patch antenna of FIG. 4A.
Figure 4A:
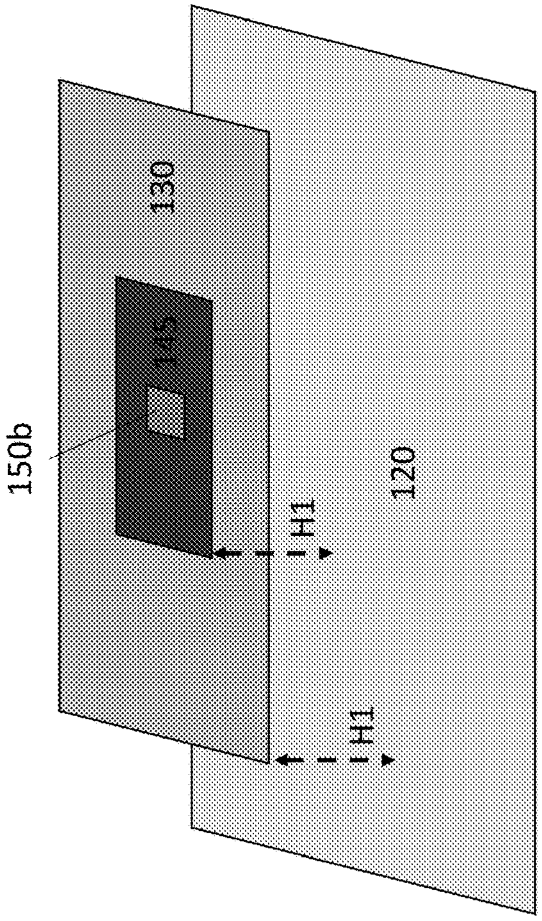
FIG. 4A is an example perspective view of a patch antenna of an antenna system including the grounded central conductor of FIG. 1.

FIG. 4A is a perspective view of the antenna system 100 configured as a patch antenna. The patch antenna is a modified example of the dual-band antenna of FIGS. 1 and 3B. In this implementation, the antenna PCB 130 can extend above the ground plane 120 by the antenna height H1, and an antenna patch 145 is located on the antenna PCB 130 forming the radiating antenna element. The patch antenna can offer relatively wide band coverage compared to any of the previous examples of the antenna system 100.

FIG. 4B is an elevational view of the patch antenna of FIG. 4A. The antenna patch 145 is separated into a first branch 145*a* and a second branch 145*b* analogous to the first part and the second part of radiating antenna element of FIG. 1. The antenna patch 145 is a planar antenna element, and the radiation pattern of the patch antenna can differ significantly from previous examples. Underneath the antenna patch 145, the coaxial cable 150 is routed to a central area where the outer conductor 150*b* couples the first branch 145*a* and the second branch 145*b* to the RF module 315. The coaxial cable 150 also forms a ground path via the central conductor 150*a*. The first branch 145*a* and the second branch 145*b* of the antenna patch 145 are operable at two or more different frequency bands of the RF module 315.

Figure 5:
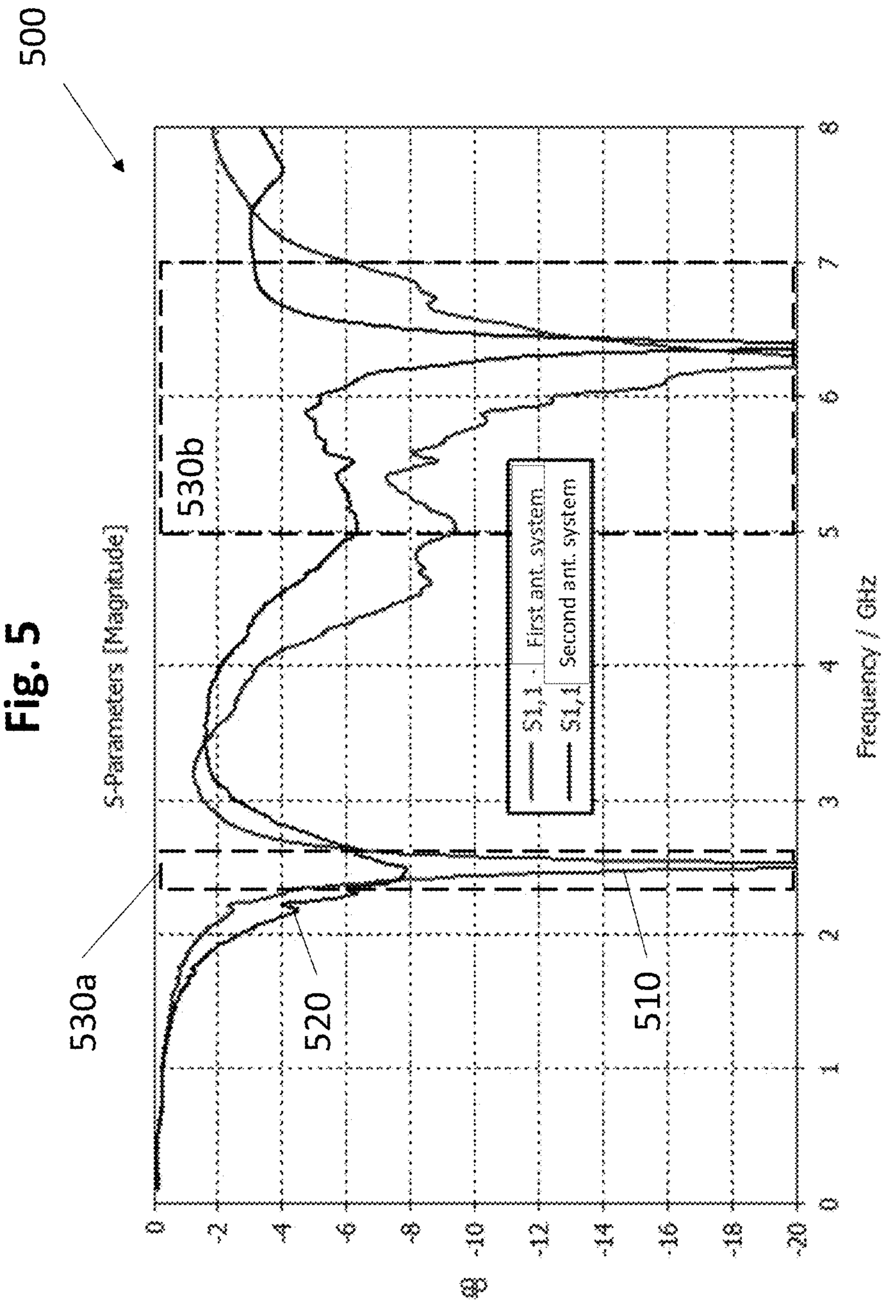
FIG. 5 is an example plot of simulated input port reflections for a first antenna system and a second antenna system, the first antenna system including the grounded central conductor of FIG. 1, and the second antenna system including an outer conductor ground path of a coaxial cable.

FIG. 5 illustrates simulation results of scattering parameter (S-parameter) S11, indicating input port reflections for two antenna systems. A horizontal axis of a chart 500 indicates a frequency range from 0 to 8 GHz and the vertical axis indicates a magnitude of the reflected signals in dB. For electronic devices operable in the 2.4-2.5 GHz Wi-Fi band and the 5-7 GHz Wi-Fi band, maintaining low input port reflections in the antenna system 100 at these frequencies is particularly relevant.

A first frequency response 510 of the antenna system 100 of FIG. 1 is compared with a second frequency response 520 of an antenna system without the central conductor ground path. Because the antenna system of the second frequency response 520 can have its RF signals coupled to ground by an outer conductor of a coaxial cable, the antenna system effectively has a reduced antenna height H1, impacting antenna performance. These effects on the radiation pattern of the antenna are seen in generally higher S 11 measurements of the second frequency response 520.

In a first region 530*a* of the chart 500 corresponding to the 2.4-2.5 GHz Wi-Fi band, the first frequency response 510 shows a high degree of attenuation (as low as −20 dB) of reflected signals. However, the second frequency response 520 only shows −8 dB of attenuation in the first region 530*a*. Accordingly, at frequencies relevant to 2.4 GHz Wi-Fi operation, the antenna system 100 of FIG. 1 can have equivalent or improved antenna performance in a more compact footprint.

In a second region 530*b* of the chart 500 corresponding to the 5-7 GHz Wi-Fi band, the first frequency response 510 and the second frequency response 520 are more similar. At frequencies above 4 GHz, the two frequency responses start to diverge, with the first frequency response 510 measuring −9 dB, −12 dB, and −6 dB at 5 GHz, 6 GHz, and 7 GHz, respectively. In contrast, the second frequency response 520 measures −6 dB, −5 dB, and −3 dB at those same frequencies. Noise rejection in the second region 530*b* for the second frequency response 520 is narrowly centered around about 6.4 GHz, indicating a lower bandwidth, while the first frequency response 510 shows generally improved noise rejection over the wider range from 5-7 GHz. For at least these reasons, the antenna system 100 of FIG. 1 can have improved performance with less input port reflection at frequencies relevant to Wi-Fi communications.

The principles the examples described herein can be used for any other system or apparatus including mobile phones, tablets, base stations, network access points, customer-premises equipment (CPE), laptops, and wearable electronics.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain examples include, while other examples do not include, certain features, elements and/or states. Thus, such conditional language is not generally intended to imply that features, elements and/or states are in any way required for one or more examples or that one or more examples necessarily include logic for deciding, with or without author input or prompting, whether these features, elements and/or states are included or are to be performed in any particular example.

What is claimed is:

1. An electronic device, comprising:

a dielectric housing;

a ground plane;

a coaxial cable including a central conductor and an outer conductor; and an antenna printed circuit board (PCB) communicatively connected to the outer conductor of the coaxial cable and located within the dielectric housing, the antenna PCB comprising:

an antenna microstrip feed located on the antenna PCB, a portion of the antenna microstrip feed forming a first part of a radiating antenna element; and an antenna feed point located on the antenna microstrip feed, wherein the outer conductor of the coaxial cable is communicatively connected to the antenna microstrip feed at the antenna feed point, wherein the central conductor is a ground path from the antenna PCB to the ground plane, and wherein the outer conductor is a second part of the radiating antenna element.

2. The electronic device of claim 1, wherein the antenna microstrip feed and outer conductor of the coaxial cable form an inverted-F antenna.

3. The electronic device of claim 2, wherein the inverted-F antenna is a dual-band antenna.

4. The electronic device of claim 3, wherein the dual-band antenna supports Wi-Fi communication in frequency ranges of 2.4-2.5 GHz and 5-7 GHz.

5. The electronic device of claim 2, wherein a second microstrip feed of the antenna PCB forms a parasitic element adjacent to the radiating antenna element.

6. The electronic device of claim 1, wherein an end portion of the coaxial cable is mounted to the antenna PCB at the antenna feed point and one additional mounting point such that the coaxial cable does not obstruct an RF line-of-sight between the antenna microstrip feed and an edge of the ground plane.

7. The electronic device of claim 6, wherein the end portion of the coaxial cable is mounted to the antenna PCB by two or more solder points.

8. The electronic device of claim 1, wherein a first antenna height measured from a first end of the first part of the radiating antenna element to an edge of the ground plane is equidistant to a second antenna height measured from a second end of the first part of the radiating antenna element to the edge of the ground plane.

9. The electronic device of claim 8, wherein a space is provided on the antenna PCB between the first part of the radiating antenna element and the edge of the ground plane such that the ground path does not interfere with a radiation pattern of the radiating antenna element.

10. An electronic device, comprising:

a display panel;

a RF transparent housing;

an RF module; and an antenna system communicatively connected to the RF module, the antenna system comprising:

a ground plane; and a coaxial cable including a central conductor and an outer conductor; and an antenna printed circuit board (PCB) communicatively connected to the outer conductor of the coaxial cable and located within a region of the RF transparent housing adjacent to an edge of the display panel, the antenna PCB comprising a planar antenna patch, wherein a portion of the antenna patch forms a first part of a radiating antenna element, wherein the central conductor forms a ground path from the antenna PCB to the ground plane, and wherein the outer conductor is a second part of the radiating antenna element.

11. The electronic device of claim 10, wherein the planar antenna patch forms an inverted-F antenna.

12. The electronic device of claim 10, wherein an end portion of the coaxial cable is mounted to the antenna PCB at an antenna feed point such that the coaxial cable does not obstruct an RF line-of-sight between the radiating antenna element and the edge of the ground plane.

13. The electronic device of claim 12, wherein the end portion of the coaxial cable is mounted to the antenna PCB by two or more solder points.

14. The electronic device of claim 13, wherein the end portion of the coaxial cable is provided without the outer conductor such that the ground path is partially unshielded.

15. An electronic device, comprising:

a dielectric housing;

a ground plane;

a coaxial cable including a central conductor and an outer conductor; and an antenna printed circuit board (PCB) communicatively connected to the outer conductor of the coaxial cable and located within the dielectric housing, the antenna PCB comprising:

an antenna microstrip feed located on the antenna PCB; and an antenna feed point located in a central region of the antenna microstrip feed such that the antenna feed point separates the antenna microstrip feed into a first part of a radiating antenna element and a second part of the radiating antenna element, wherein the outer conductor of the coaxial cable is communicatively connected to the antenna microstrip feed at the antenna feed point, wherein the central conductor is a ground path from the antenna PCB to the ground plane, wherein the outer conductor is a third part of the radiating antenna element, and wherein the first part of the radiating antenna element has a first length and the second part of the radiating antenna element has a second length corresponding to two different wavelengths of RF signals.

16. The electronic device of claim 15, wherein the antenna microstrip feed and coaxial cable form a dual-band antenna supporting Wi-Fi communication in frequency ranges of 2.4-2.5 GHz and 5-7 GHz.

17. The electronic device of claim 16, further comprising an RF module communicatively coupled to the outer conductor of the coaxial cable to transmit or receive RF signals by the dual-band antenna.

18. The electronic device of claim 15, wherein the third part of the radiating antenna element has a third length such that a characteristic impedance of the coaxial cable matches a characteristic impedance of the antenna microstrip feed.

19. The electronic device of claim 15, wherein a first antenna height measured from an end of the first part of the radiating antenna element to an edge of the ground plane is equidistant to a second antenna height measured from an end of the second part of the radiating antenna element to the edge of the ground plane.

20. The electronic device of claim 15, wherein a space is provided on the antenna PCB between the first part of the radiating antenna element or the second part of the radiating antenna element and an edge of the ground plane such that the ground path does not interfere with a radiation pattern of the radiating antenna element.

* * * * *